United States Patent
Tomiuchi et al.

[19]

[11] Patent Number: 6,105,317
[45] Date of Patent: Aug. 22, 2000

[54] MOUNTING SYSTEM FOR INSTALLING AN ARRAY OF SOLAR BATTERY MODULES OF A PANEL-LIKE CONFIGURATION ON A ROOF

[75] Inventors: Shinichi Tomiuchi, Ashiya; Yosuke Noda, Hirakata; Kenji Osaka, Hirakata; Shigeki Takeda, Hirakata; Tomohide Yoshida, Nabari; Shinji Urano, Ueno; Takayoshi Akai, Ueno; Norihisa Tanimoto, Ueno, all of Japan

[73] Assignee: Matsushita Electric Works, Ltd., Osaka, Japan

[21] Appl. No.: 09/132,825

[22] Filed: Aug. 12, 1998

[30] Foreign Application Priority Data

| Sep. 24, 1997 | [JP] | Japan | 9-259057 |
| Apr. 21, 1998 | [JP] | Japan | 10-111188 |
| Apr. 21, 1998 | [JP] | Japan | 10-111189 |

[51] Int. Cl.[7] .................................................. E04D 13/18
[52] U.S. Cl. .............................. 52/173.3; 52/460; 52/464; 52/467; 52/468; 52/506.06
[58] Field of Search ................................. 52/173.3, 460, 52/464, 467, 468, 469, 506.06; 126/623

[56] References Cited

U.S. PATENT DOCUMENTS

| 4,114,595 | 9/1978 | Barker ...................................... 126/648 |
| 4,178,910 | 12/1979 | Gramer et al. ........................... 126/677 |
| 4,223,667 | 9/1980 | Paymal ..................................... 126/621 |
| 4,297,990 | 11/1981 | Allisbaugh ............................... 126/667 |
| 4,299,202 | 11/1981 | Mayo et al. .............................. 126/649 |
| 4,347,093 | 8/1982 | Mayo et al. .............................. 156/242 |
| 4,392,483 | 7/1983 | Koenig ..................................... 126/650 |
| 5,163,257 | 11/1992 | Crowell ..................................... 52/200 |
| 5,406,936 | 4/1995 | Hirai et al. ............................... 126/623 |
| 5,409,549 | 4/1995 | Mori ......................................... 136/244 |
| 5,497,587 | 3/1996 | Hirai et al. . |
| 5,509,973 | 4/1996 | Ishikawa et al. ........................ 136/251 |
| 5,571,338 | 11/1996 | Kadonome et al. ..................... 136/251 |
| 5,697,192 | 12/1997 | Inoue ...................................... 52/173.3 |
| 5,706,617 | 1/1998 | Hirai et al. .............................. 52/173.3 |
| 5,768,831 | 6/1998 | Melchior ................................. 52/173.3 |
| 5,787,653 | 8/1998 | Sakai et al. ............................. 52/173.3 |

FOREIGN PATENT DOCUMENTS

0619404A2  10/1994  European Pat. Off. .

*Primary Examiner*—Christopher T. Kent
*Assistant Examiner*—Jennifer I. Thissell
*Attorney, Agent, or Firm*—Arent, Fox Kintner Plotkin & Kahn

[57] ABSTRACT

A mounting system that is capable of effectively draining the rainwater off the roof, while enabling easy installation of the solar battery modules. The mounting system is adapted to install on the roof an array of the solar battery modules each of a panel-like configuration with a rectangular frame. The system includes a plurality of vertical rails which are secured to the roof and extend along a roof sloping direction towards eaves from a ridge of the roof for holding the solar battery modules between a laterally spaced pair of the vertical rails in a spaced relation from a roof sheathing. Each of the vertical rails is formed on opposite sides thereof respectively with stepped shoulders which extend the full length of the vertical rail for supporting thereon the frame of the laterally adjoining solar battery modules. The vertical rail is further formed on opposite sides thereof with respective trough sections which extend the full length of the vertical rail and are disposed below and outwardly of the corresponding stepped shoulders for receiving the rainwater sneaking along the frame. Thus, the rainwater is effectively prohibited from reaching the roof sheathing and advancing through the roof into interior of the house.

10 Claims, 20 Drawing Sheets

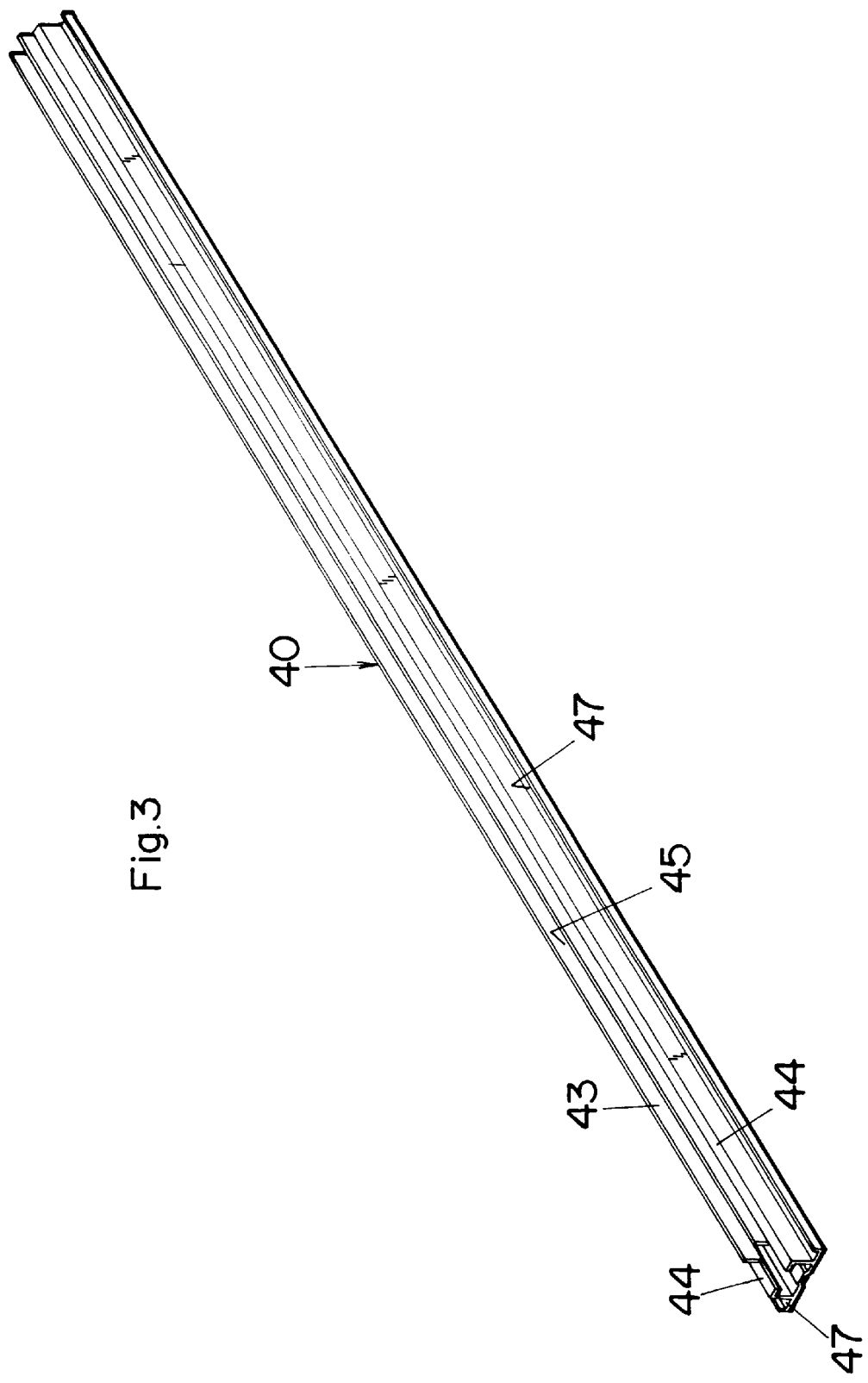

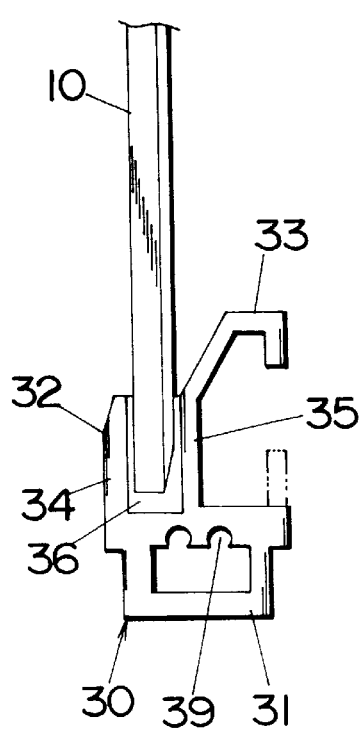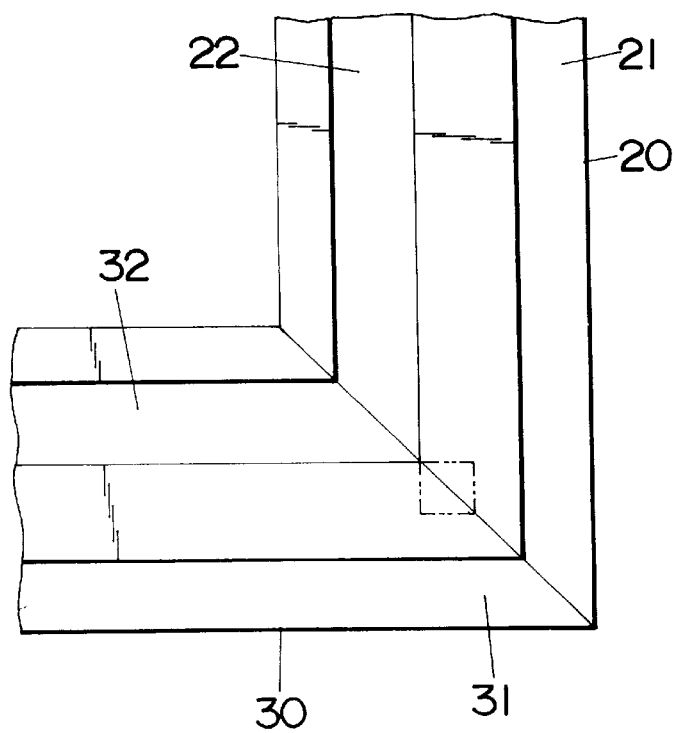
Fig.4B
Fig.4A

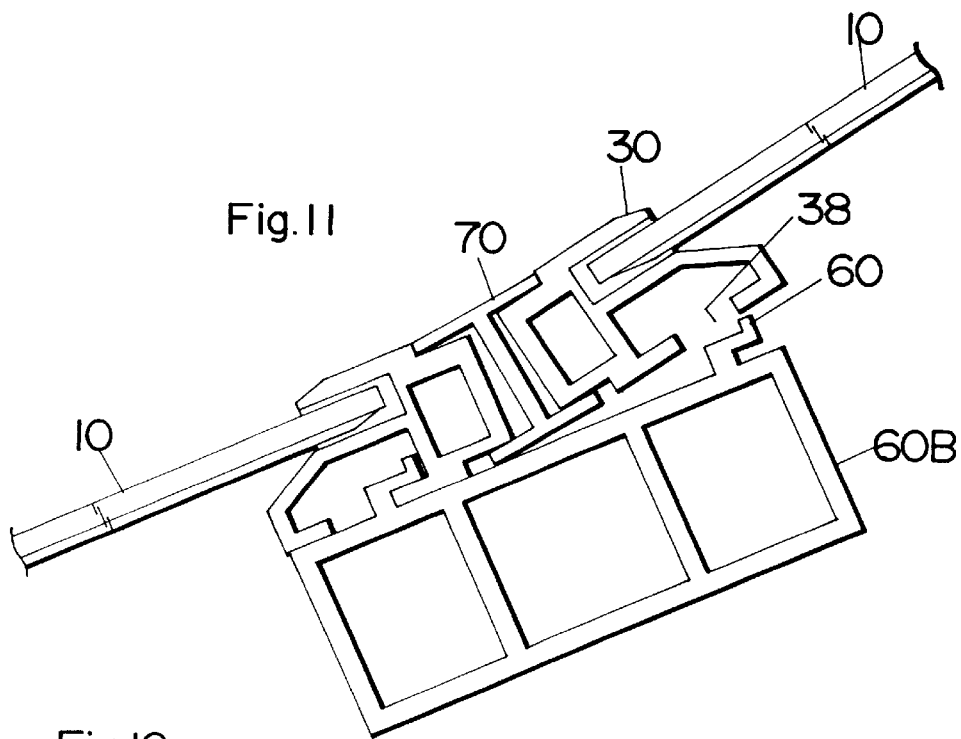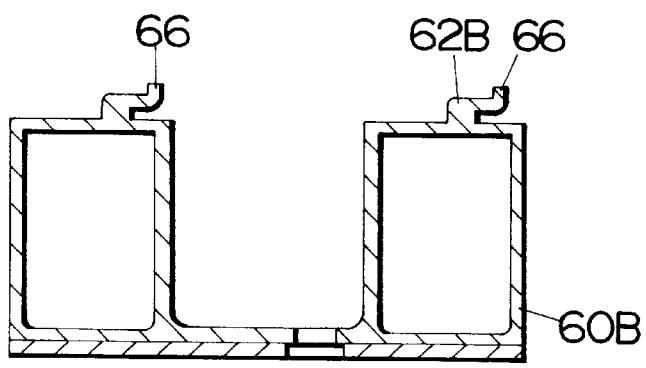

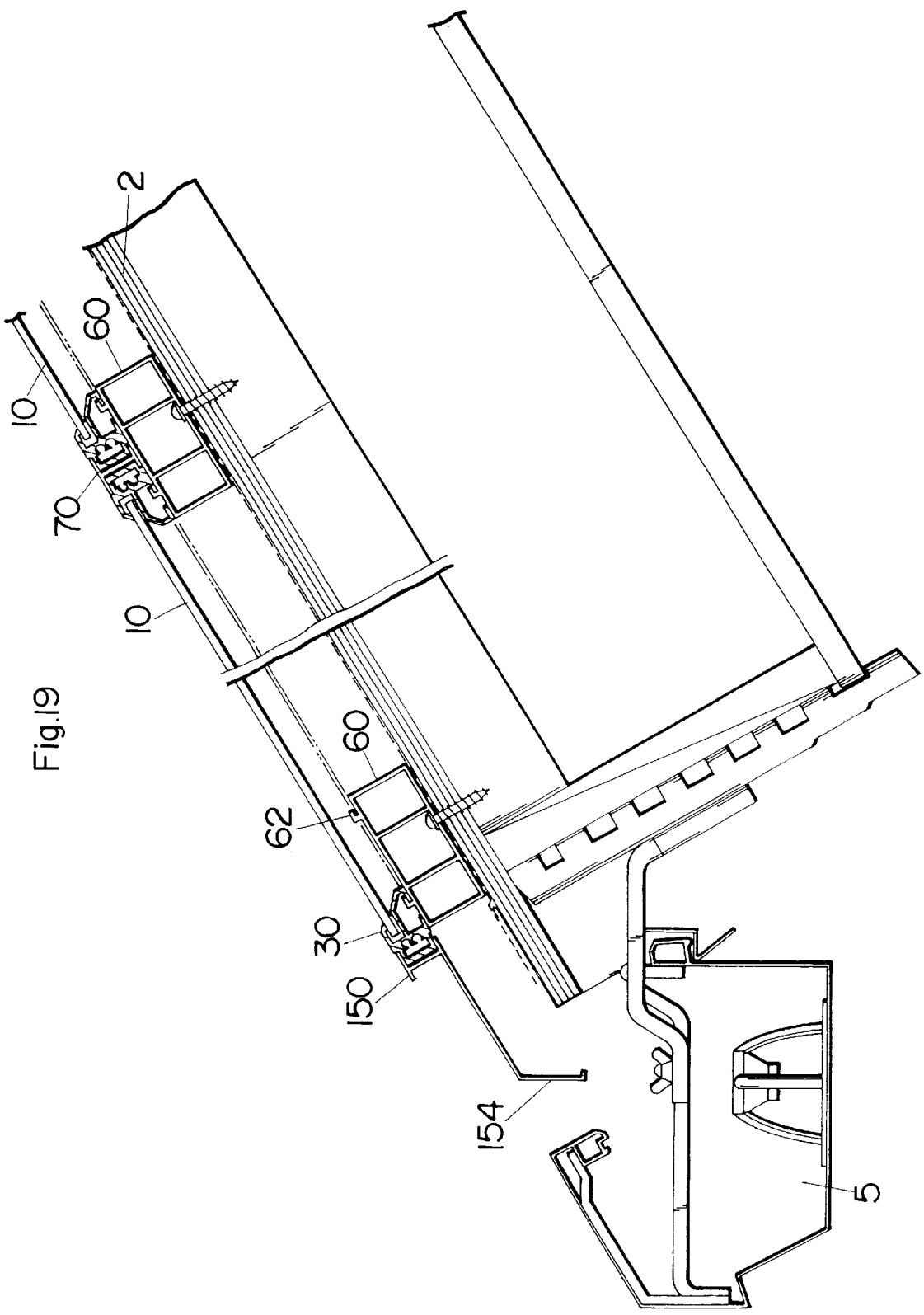

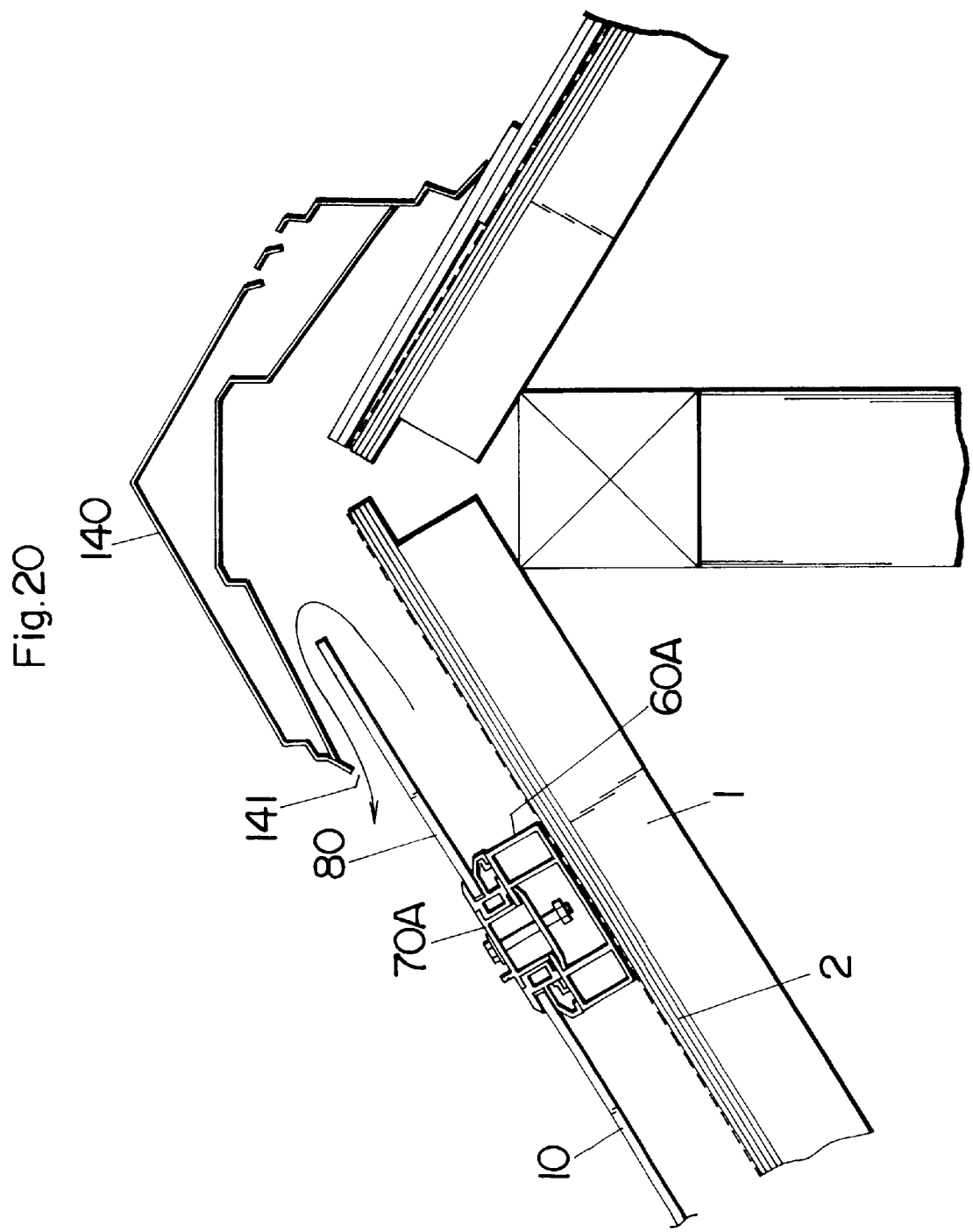

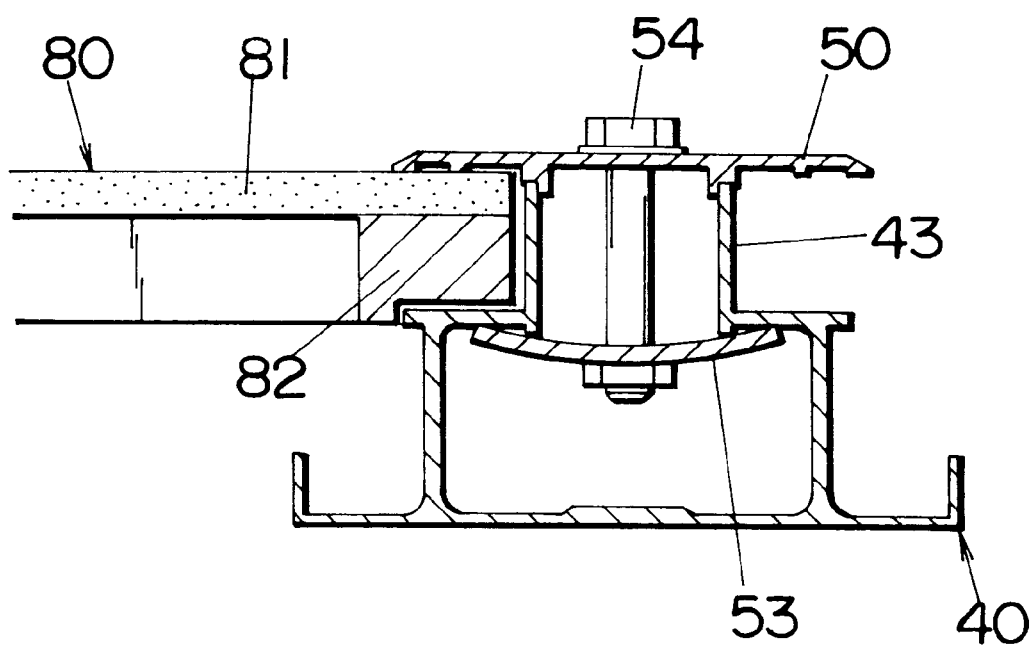

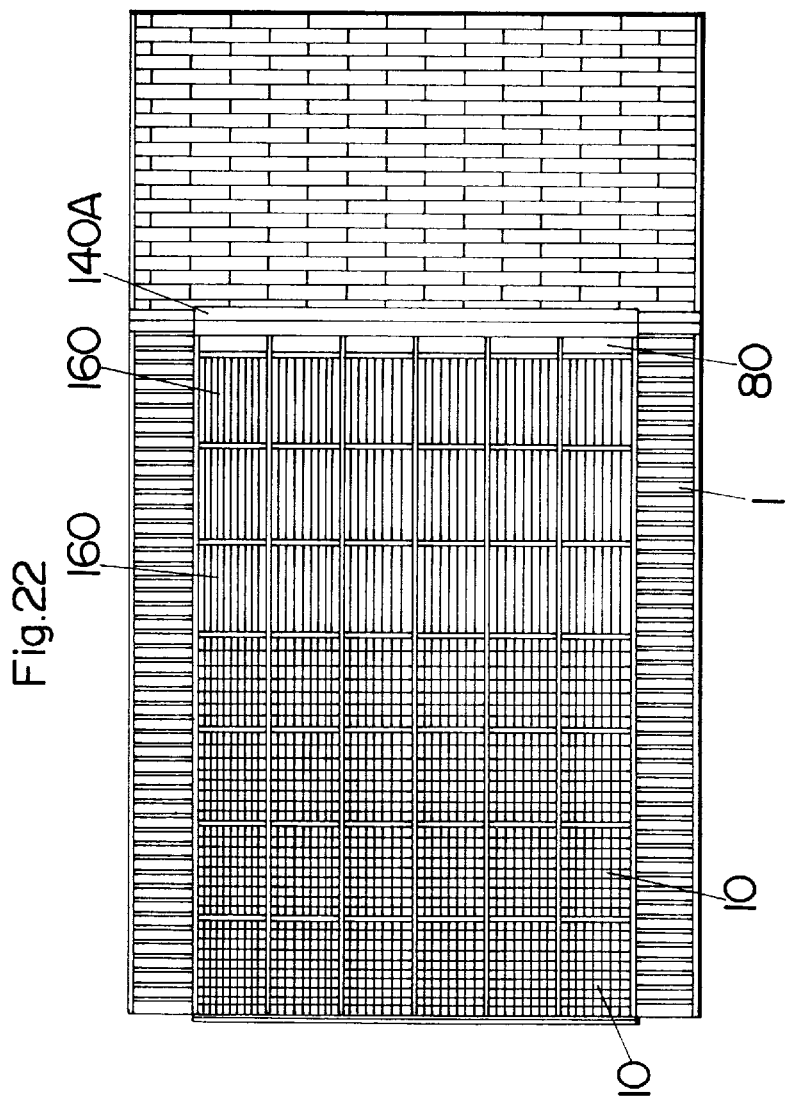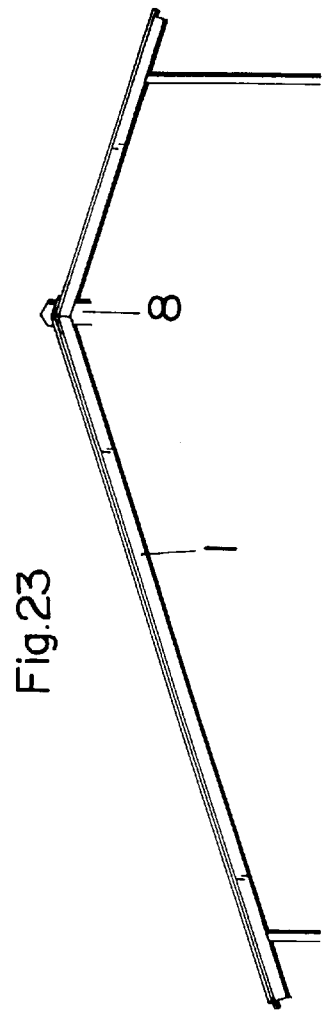

MOUNTING SYSTEM FOR INSTALLING AN ARRAY OF SOLAR BATTERY MODULES OF A PANEL-LIKE CONFIGURATION ON A ROOF

BACKGROUND OF THE INVENTION

1. Field of the Invention

The present invention is directed to a mounting system for installing an array of solar battery modules on a roof, and more particular to such a system of installing the solar battery modules between laterally spaced vertical rails extending along a sloping direction of the roof.

There has been an increasing demand of utilizing a solar energy as a clean alternative for individual homes. Solar battery modules are of particular interest and are widely utilized as being installed on the roof of a house. Generally, each of the solar battery modules arranged in an array is held between vertical rails secured on the roof. However, a practical installation of the solar battery modules requires to avoid leaking of rainwater proceeding through a joint between the frame of the solar battery module and the vertical rail, as well as other problems encountered when mounting the modules on the roof.

SUMMARY OF THE INVENTION

The present invention has been accomplished in view of the above and provides a mounting system which enables an easy installation of the solar battery modules, yet effectively draining the rainwater which proceeds between the solar battery modules. The mounting system in accordance with the present invention is adapted to install on the roof an array of the solar battery modules each of a panel-like configuration and each comprising a plurality of solar cells arranged within a rectangular frame. The system comprises a plurality of vertical rails which are secured to the roof and extend along a roof sloping direction towards eaves from a ridge of the roof for holding the solar battery module between a laterally spaced pair of the vertical rails in a spaced relation from a roof sheathing. Each of the vertical rails is formed on opposite sides thereof respectively with stepped shoulders which extend the fill length of the vertical rail for supporting thereon the frame of the laterally adjoining solar battery modules. The vertical rail is further formed on opposite sides thereof with respective trough sections which extend the full length of the vertical rail and are disposed below and outwardly of the corresponding stepped shoulders for receiving the rainwater sneaking down through a joint between the frame and the vertical rail or through a possible gap between the frame and a panel carrying the solar cells. Thus, the rainwater is effectively prohibited from reaching the roof sheathing and leaking through the roof.

The solar battery modules are secured to the vertical rails by using a combination of a top cover and an anchor plate attached to the vertical rail. The vertical rail has a top opening defined between a pair of opposed fins upstanding from inward edges of the stepped shoulders. The top cover is fitted over the top opening to have its opposite ends overlapped with the frames of the adjoining solar battery modules. The anchor plate is disposed inside of the vertical rail with its opposite lateral ends abutting against behind the stepped shoulders. A bolt interconnects the top plate and the anchor plate so that the top cover presses the frames against the associated stepped shoulders as a result of the anchor plate being pulled towards the top cover by fastening the bolt. Thus, the solar battery modules can be readily and firmly secured to the vertical rail.

The system may include an end top cover adapted to cover the vertical rail bordering on an outer column of the solar battery modules in the array. The end top cover is formed on its one lateral side with a flange extending over the frame of the solar battery module and is also formed on the other lateral side with an extension flange extending laterally beyond the corresponding stepped shoulder and reaching shingles disposed laterally adjacent to the column of the solar battery module. The extension flange is formed with a shoe placed on the corresponding stepped shoulder as a counterpart of the frame. The end top cover is utilized in combination with the anchor plate and the bolt to secure the solar battery module to the laterally outermost vertical rail. With the use of the end top cover, the solar battery modules in the outer column of the array can have a neatly finished connection with the adjacent shingles.

The system further includes a plurality of horizontal rails extending in a direction perpendicular to the sloping direction each for engagement with an intermediate portion of the frame between the lateral ends of each of the vertically adjoining solar battery modules. Each horizontal rail is adapted to be secured at its bottom to the roof and is formed on opposite sides of the horizontal rail respectively with hooks for engagement with the frames of the adjoining solar battery modules. Thus, an easy interconnection can be made for the solar battery modules which are arranged vertically in the sloping direction of the roof.

At least one of the horizontal rails has a second top opening defined between a pair of opposite ledges each provided with the hook. The second top opening is utilized to secure the frame of the solar battery module to the horizontal rail by the use of a second top cover and an associated second anchor plate. The second top cover extends the full width between a pair of the adjacent vertical rails and is fitted over the frames of the adjoining solar battery modules or equivalents. The second anchor plate disposed inside of the horizontal rail with opposite ends the second anchor plate abutting respectively behind the ledges. A bolt extends through the second top opening for interconnecting the second top cover and the second anchor plate in such a manner that the second top cover presses the frames of the solar battery module and the equivalent against the corresponding ledges, thereby securing the solar battery module to the horizontal rail. Thus, the solar battery module can be easily secured to the horizontal rail with the second top cover hiding an interface between the vertically arranged solar battery modules or the equivalent thereof.

The system may further include an eaves attachment which is connected to the horizontal rail extending along the eaves of the roof. The eaves attachment is of a unitary structure composed of a top flange and a bottom flange integrally connected by a web. The top flange and the bottom flange on one side of the web is cooperative to form therebetween a catch recess for receiving therein the frame of the solar battery module sitting on the horizontal frame extending along the eaves. The bottom flange on the other side of the web extends to define an apron which covers the eaves of the roof. With the provision of the catch recess, the eaves attachment can be readily attached to the horizontal rail.

The system may include a ventilation module for feeding outside air into an internal space between the roof sheathing and the solar battery modules located nearer to the ridge of the roof than the ventilation module. The ventilation module is of the same planar dimensions as that of the solar battery module and has a rectangular frame of the same configuration as utilized in the solar battery module so as to be held between the vertical rails. The ventilation module has an upper plate with a plurality of inlets of introducing the outside air and a lower plate shaped to flow thus introduced outside air towards the internal space. The outside air introduced by provision of the ventilation module is caused to flow the internal space behind the solar battery modules along the sloping direction of the roof to thereby cool the solar battery modules for maintaining an optimum efficiency of generating the electric energy.

Dummy modules may be utilized in the system to fill a gap between the uppermost row of the solar battery modules and a ridge cover at the ridge of the roof. The dummy module has the same horizontal width as the solar battery module to be supported between the vertical rails and is made of such a material as to be easily cut off for adjustment of the length along the sloping direction. With the use of the dummy module or modules, the array of the solar battery modules can be installed on the roof of varying sloping length without exposing undesired gap adjacent to the ridge of the roof.

The frame of the solar battery module is composed of a pair of opposed vertical channel members and a pair of opposed horizontal channel members integrally connected by the vertical channel members. Both members are of the same cross section having a fringe section and a drain section formed immediately below the fringe section. Formed in the fringe section is an inwardly open recess for receiving therein the periphery of a substrate carrying the solar cells of the solar battery module. The recess is defined between an upper fringe and a lower fringe which also forms an upper part of the drain section and is bent at its inward end downwardly to define an inclined edge thereat. The drain section is formed in its bottom with a slit for dripping the rainwater proceeding along the lower fringe and around the inclined edge off the drain section towards the trough section of the vertical rail. Each of the horizontal and vertical channel members is further formed with at least one screw hole extending along the full length thereof for receiving a screw securing the horizontal and vertical channel members to make a miter joint therebetween. With this arrangement of the frame, the rainwater sneaking between the frame of the solar battery module and the vertical rail can be successfully collected into the trough section of the vertical rail to be discharged outwardly of the eaves.

At least one solar collector module may be included in the array of the solar battery modules for accumulating the solar energy and heating the air flowing through a space between the solar collector module and the roof sheathing. The solar collector module is of the same planar configuration to be held between the vertical rails in a spaced relation from the roof sheathing. Baffle means is additionally provided on the bottom of the solar collector module to reduce a flow speed of the air flowing through the space from eaves towards the ridge. Thus heated air is collected through an opening at the ridge of the roof into a room below the roof for use in the house. The solar collector module comprises a glass plate, a corrugated metal sheet disposed below the glass plate, supporting strips secured to the metal sheet, and a frame of the same configuration as employed in the solar battery module. The supporting strips extend along one dimension of the solar collector module and are secured at their distal ends to the frame together with the corresponding ends of the glass plate.

These and still other objects and advantageous features of the present invention will become more apparent from the following description of the preferred embodiment when taken in conjunction with the attached drawings.

BRIEF DESCRIPTION OF THE DRAWINGS

FIG. 3 is a perspective view of the vertical rail;

FIG. 4A is a plan view illustrating a miter joint at a corner of a frame of the solar battery module;

FIG. 4B is a sectional view at the corner of the frame;

FIG. 10 is a sectional view of a modified horizontal rail;

FIG. 11 is a sectional view illustrating an advantage of utilizing the modified horizontal rail;

FIG. 19 is a sectional view of the eaves attachment connected to the horizontal rail of supporting the solar battery module;

FIG. 20 is a sectional view illustrating a connection of the array of the solar battery module and a dummy module shown with a ridge cover;

FIG. 21 is a sectional view of the dummy module connected to the vertical rail;

FIG. 22 is a plan view illustrating another array of the solar battery modules and solar collector modules installed on a roof;

FIG. 23 is a side view of the roof installed with the array of FIG. 22;

DETAILED DESCRIPTION OF THE EMBODIMENTS

Figure 1:
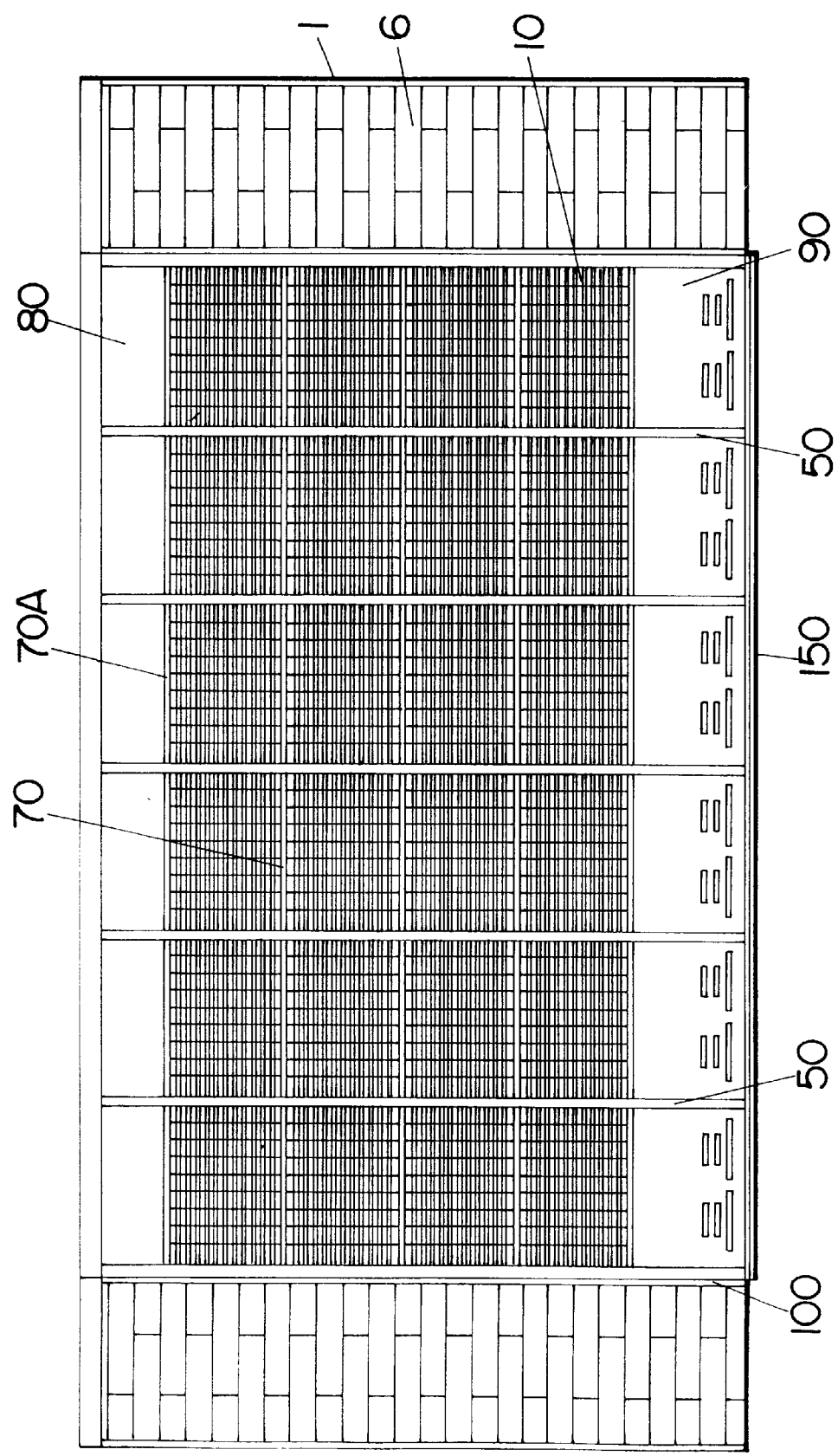
FIG. 1 is a plan view of an array of solar battery modules installed on the roof of a house.
Figure 2:
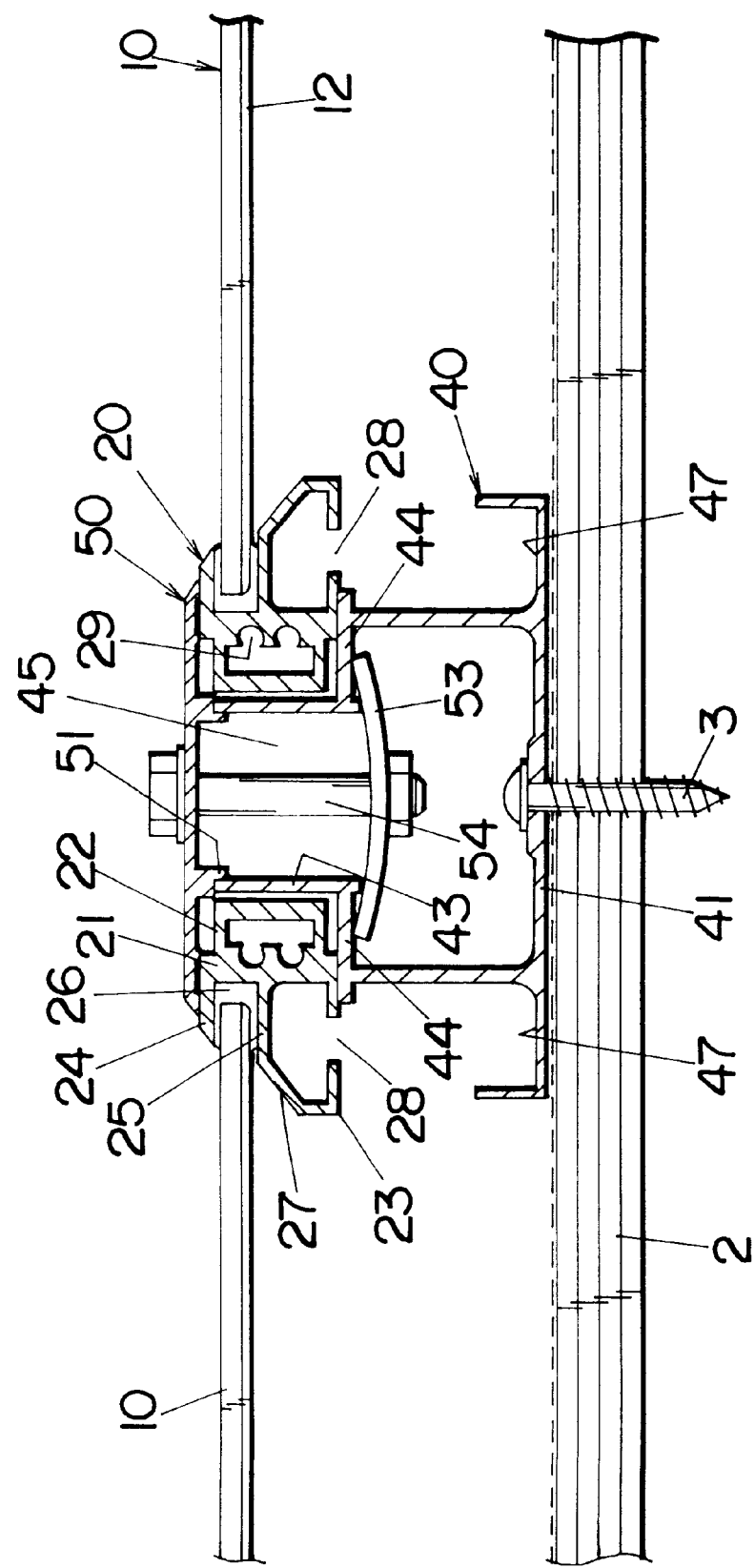
FIG. 2 is a sectional view of a vertical rail for connection of the laterally adjacent solar battery modules.
Figure 6:
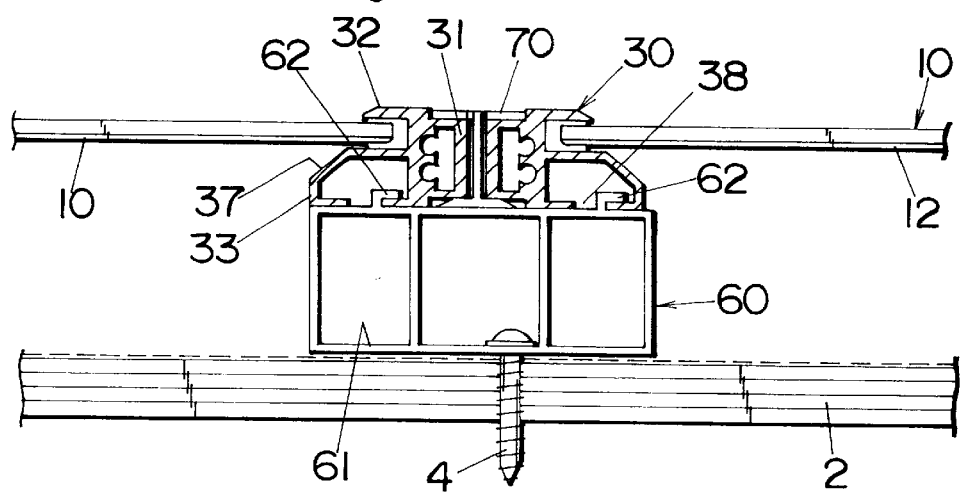
FIG. 6 is a sectional view of the horizontal rail for connection of the solar battery modules arranged along a sloping direction of the roof, shown with a water-seal fitting between the frames of the solar battery

Referring now to FIG. 1, there is shown an array of solar battery modules 10 arranged in two dimensions on a roof 1 of a house and supported by a plurality of vertical rails 40 and a plurality of horizontal rails 60 both made of aluminum and secured to the roof. The array may include dummy modules 80 and one or more ventilation module 90 analogous to the solar battery module 10. Each solar battery modules 10 is of a panel-like configuration including a rectangular frame enclosing therein a substrate 12 for carrying a number of solar cells, as shown in FIG. 2. The frame is composed of a pair of vertical channel members 20 and a pair of horizontal channel members 30 connected by the vertical channel members 20 to have four corners of miter joints as shown in FIG. 4A. As shown in FIGS. 2 and 6, the vertical and horizontal channel members 20 and 30 (hereinafter referred to simply as vertical frame and horizontal frame) are made of aluminum to have the same cross section having a hollow section 21, 31 integrally formed on the inner face thereof with a vertically spaced pair of a fringe section 22, 32 and a drain section 23, 33. The fringe section 22, 32 is formed with a channel or inwardly open recess 26, 36 defined between an upper fringe 24, 34 and a lower fringe 25, 35 for receiving the periphery of the substrate 12 of the solar battery module 10. Any suitable sealing rim may be provided around the periphery of the substrate 12 to be received in the recesses. The lower fringe 25, 35 defines itself an upper part of the drain section 23, 33 and is bent downwardly at its inner end to define an inclined edge 27, 37. The drain section 23, 33 is provided in its bottom with a slit 28, 38 for dripping rainwater proceeding along the lower fringe and the inclined edge for the vertical frame 20. The slit 38 of the horizontal frame 30 is utilized for engagement with the horizontal rail 60, as will be explained later. The hollow section 21, 31 are formed with a pair of screw holes 29 respectively for receiving screws of fastening the vertical and horizontal channel members at the miter joint therebetween.

Figure 7:
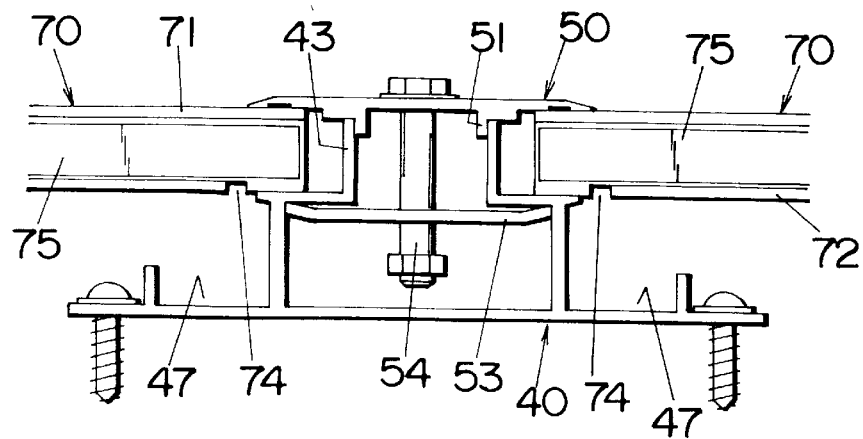
FIG. 7 is a sectional view of a connection of the water-seal fittings with the vertical rail.
Figure 13:
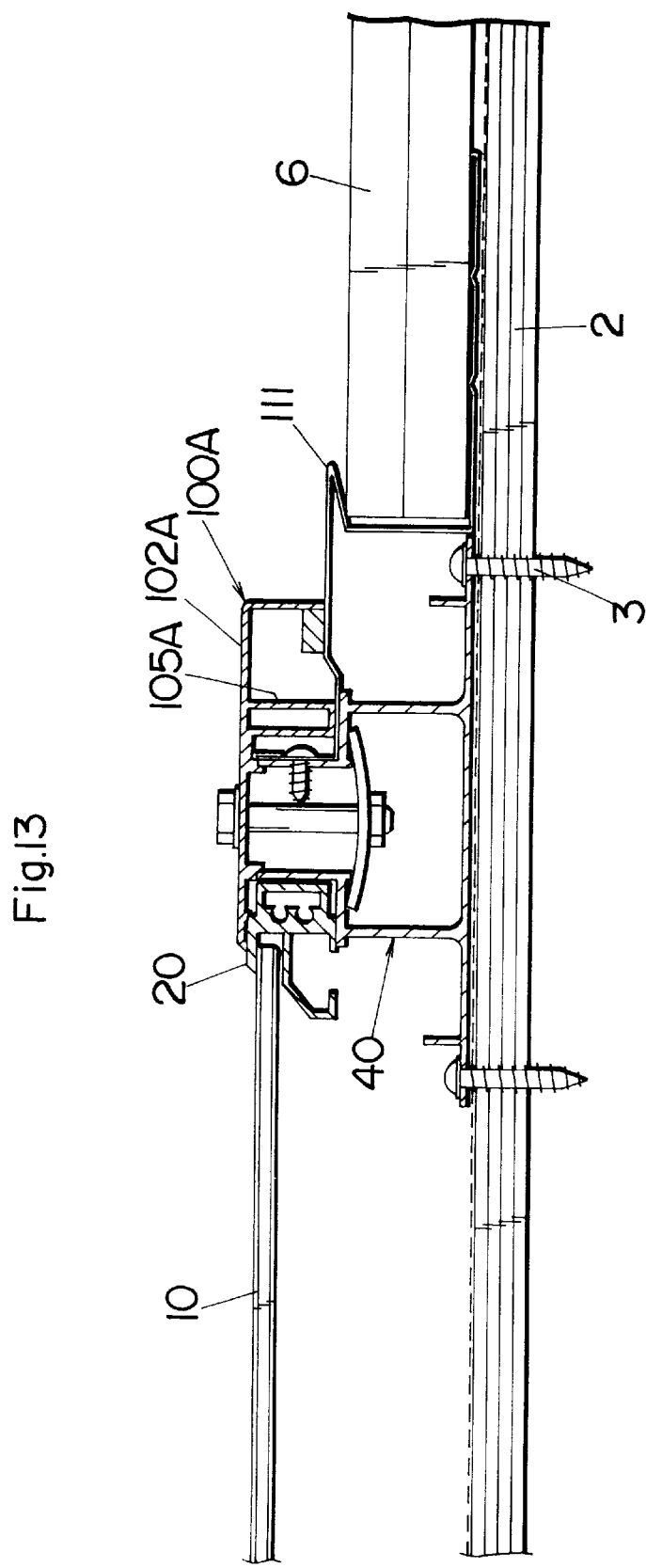
FIG. 13 is a sectional view of another end top cover secured to the vertical rail and extending over an adjacent shingles.
Figure 14:
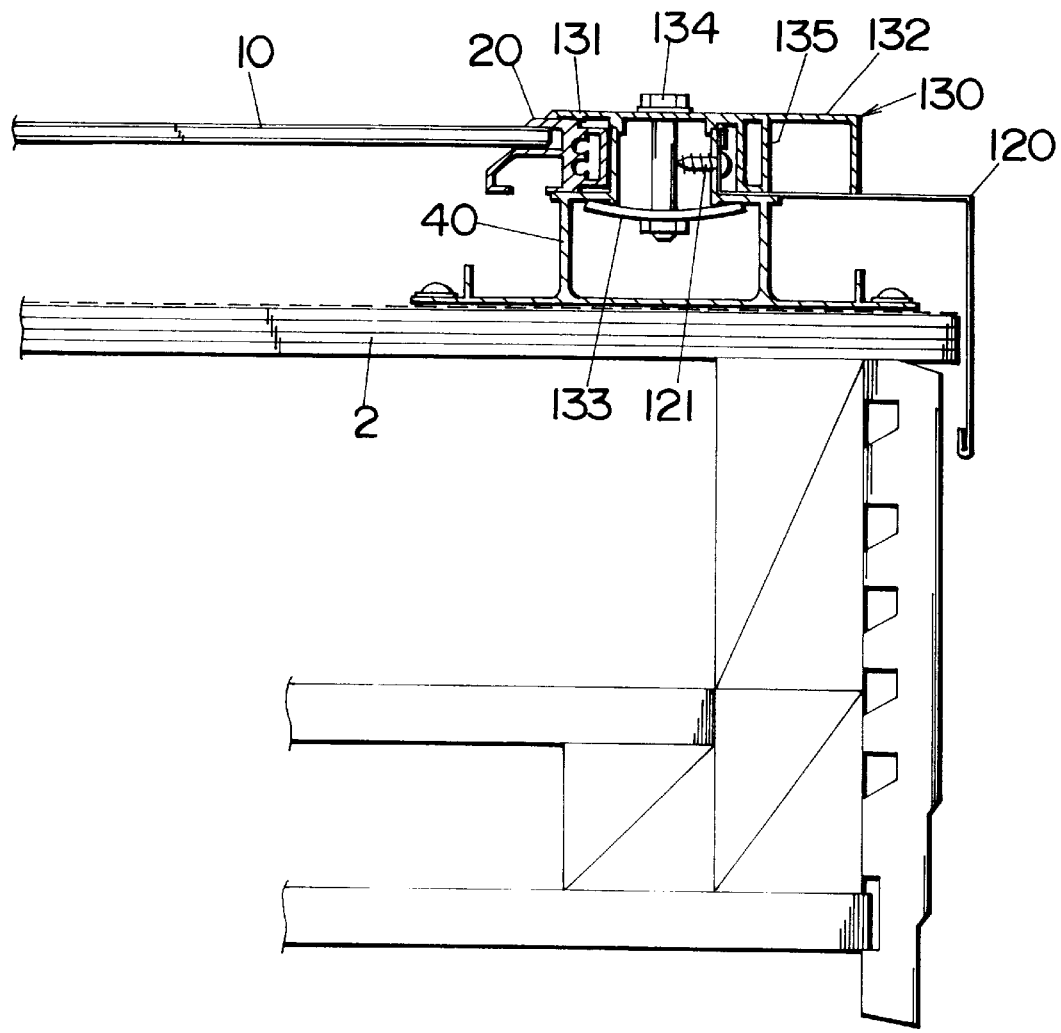
FIG. 14 is a sectional view of a gable end cover secured to the vertical rail for covering the gable end of the roof.

The vertical rails 40 are mounted parallel on the roof to extend the full length along a sloping direction from the ridge to the eaves of the roof. As shown in FIGS. 2 and 3, the vertical rail 40 includes a generally rectangular base 41 secured to an roof sheathing 2 by means of screws 3 extending through the bottom of the base 41. The base 41 is formed with an opposed pair of inwardly projecting shelves and an opposed pair of fins 43 upstanding from the inward edge of the shelves to form a pair of stepped shoulders 44 outwardly of the fins 43 for receiving thereon the vertical frame 20 of the laterally adjoining solar battery modules 10, and at the same time to form a top opening 45 between the fins 43. The base 41 is also formed on its opposite ends with trough sections 47 which are offset laterally outwardly of the stepped shoulders 44 so as to be located below the drain section 23 of the vertical frame 20 for collecting the rainwater dripped from the drain section 23 of the vertical frame 20 and flowing it along the sloping direction into a gutter 5 at the eaves of the roof. As will be explained later, the fins 43 at the front end of the vertical rail 40 is removed for connection with an eave attachment 150. It is noted in this connection that, as shown in FIGS. 4A and 4B, at least one of the vertical frame 20 and horizontal frame 30 is finished to cut off a portion (indicated by phantom lines) of the drain section 23, 33, in order to avoid the rainwater from advancing from the vertical frame 20 to the horizontal frame 30, or vice versa. Further, the vertical rail 40 may be modified to be secured by screws at the opposite ends of the base outwardly of the trough sections, as shown in FIGS. 7, 13, and 14.

The laterally adjacent solar battery modules 10 or equivalent modules 80 and 90 are secured to the vertical rail 40 by use of a top cover 50 which closes the top opening thereof and is fastened to an anchor plate 53 disposed inside of the vertical rail 40 by means of a bolt 54, as shown in FIG. 2. A plurality of the top covers 50 are attached to the single vertical rail 40 to extends the full length of the vertical rail. The top cover 50 has a pair of studs 51 engaged with the upper end of the fins 43 and is placed upon the vertical rail 40 with the opposite ends of the top cover extending over the vertical frame 20 of the laterally adjoining modules. The anchor plate 53 has its opposite ends abutting behind the stepped shoulders 44 so that the fastening of the bolt 54 will press the top cover 50 against the fins 43 as well as the vertical frames 20 of the adjoining modules, thereby securing the modules to the vertical rail 40. Sealing members of a rubber or the like are held on the bottom of the top cover 50 for giving an effective water-tight seal against the vertical frames 20.

Figure 5:
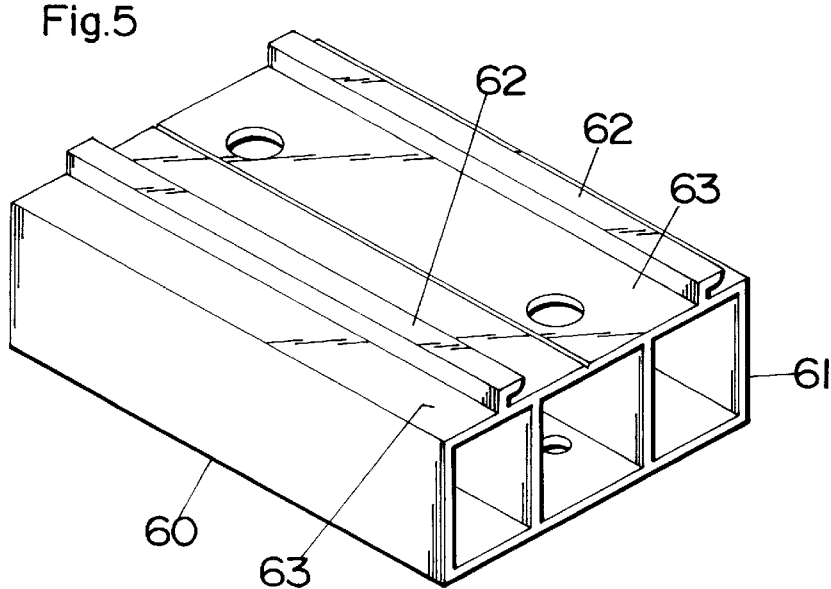
FIG. 5 is a perspective view of a horizontal rail utilized in the present invention.
Figures 8A, 8B:
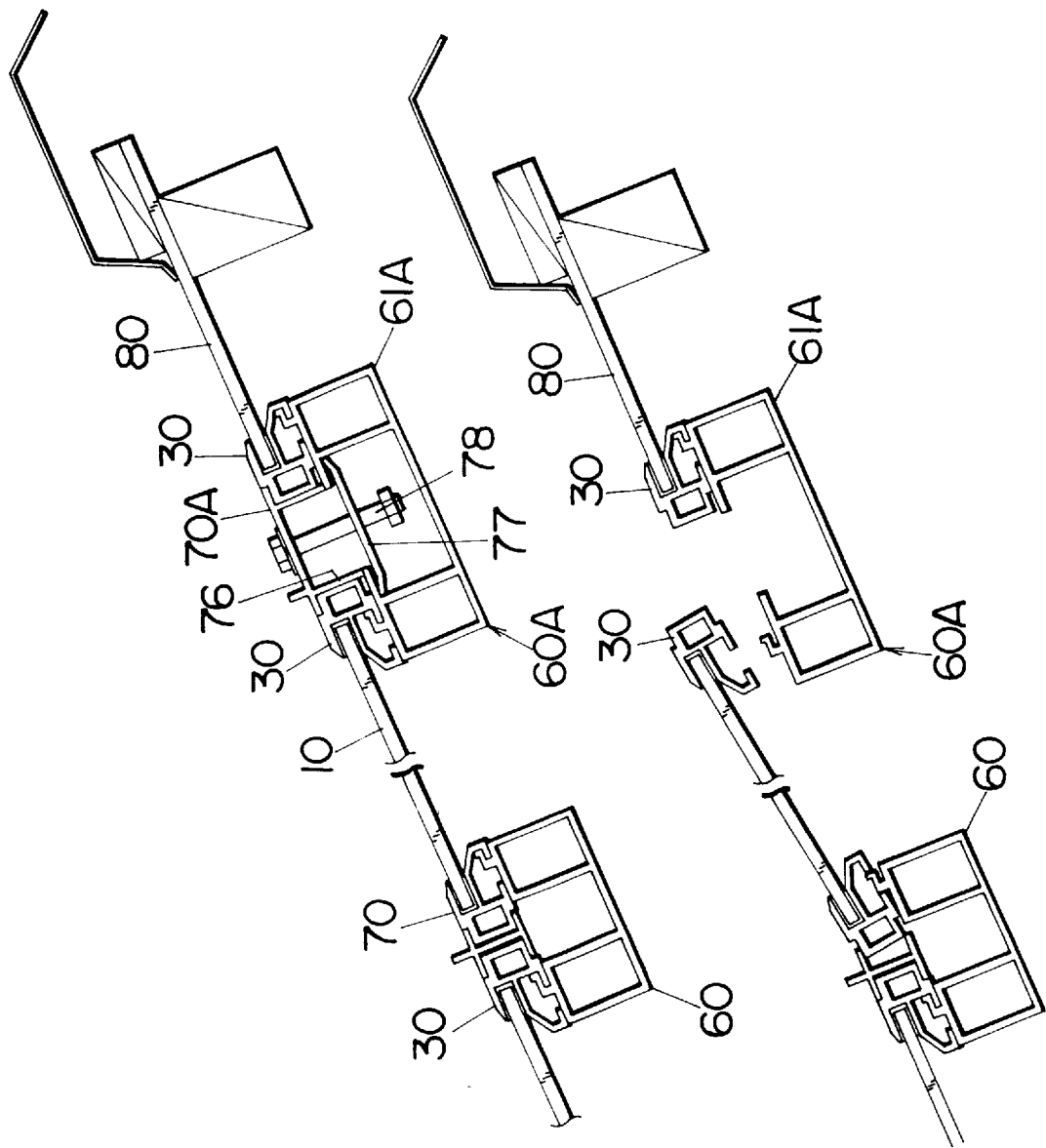
FIGS. 8A and 8B illustrate connection and disconnection of the solar battery modules with and from the associated horizontal rails, respectively.

As shown in FIGS. 5 and 6, the horizontal rail 60 is of a length shorter than the width of the solar battery module 10 and is secured to the roof sheathing 2 by screws 4 extending through the bottom of the horizontal rail to support thereon the intermediate portions of the horizontal frame 30 of the solar battery module 10 or equivalent module. The horizontal rail 60 includes a hollow base 61 with a pair of parallel hooks 62 projecting on the upper surface of the base 61 for engagement with slits 38 of the horizontal frame 30 to secure the module 10 to the horizontal rail 60. As shown in FIG. 6, a water-seal fitting 70 is held between the horizontal frames 30 of the vertically adjoining modules on the horizontal rails 60, and extends the full width of the module between the adjacent pair of the vertical rails 40 for sealing a gap therebetween. The water-seal fitting 70 is of a generally H-shaped cross section with an upper flange 71 and a lower flange 72 connected by a web 73. The upper flange 71 covers the hollow sections 31 of the adjoining horizontal frames 30, while the lower flange 72 is held between the hollow sections 31 and the upper end of the horizontal rail 60. As shown in FIG. 7, the lower flange 72 of the water-seal fitting 70 is formed with a notch 74 at opposite lengthwise ends of the fitting in order to drip the rainwater accidentally advancing along the fitting for collection into the trough sections 47 of the vertical rail 40. Sealing members 75 is provided on both sides of the web 73 to give a tight water-seal with the corresponding horizontal frames 30. A horizontal rail 60A of another type is utilized to interconnect the upper two horizontal rows of the modules, i.e., the solar battery module 10 and the dummy module 80. As shown in FIGS. 8A and 8B, the horizontal rail 60A of this type is analogous to the vertical rail 40 and includes a base 61A with a top opening between a pair of ledges 63 each provided with a hook 62A for engagement with the horizontal frames 30.

Figure 9A:
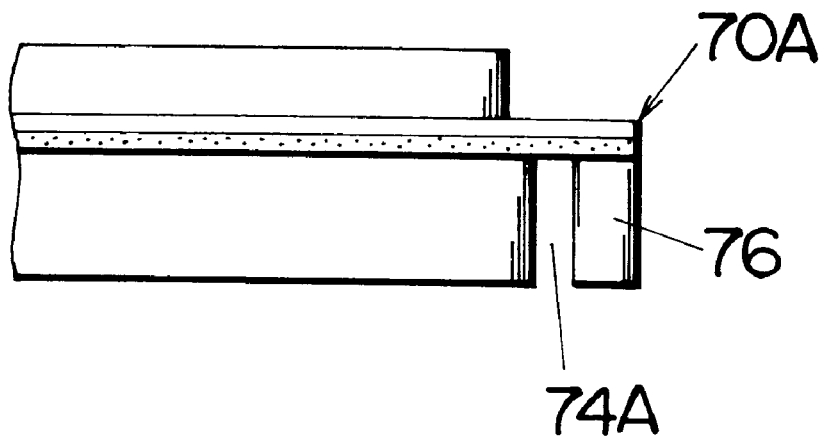
FIGS. 9A and 9B illustrate front and bottom views of an end portion of horizontal top cover utilized to secure the solar battery module to the horizontal rail.
Figure 9B:
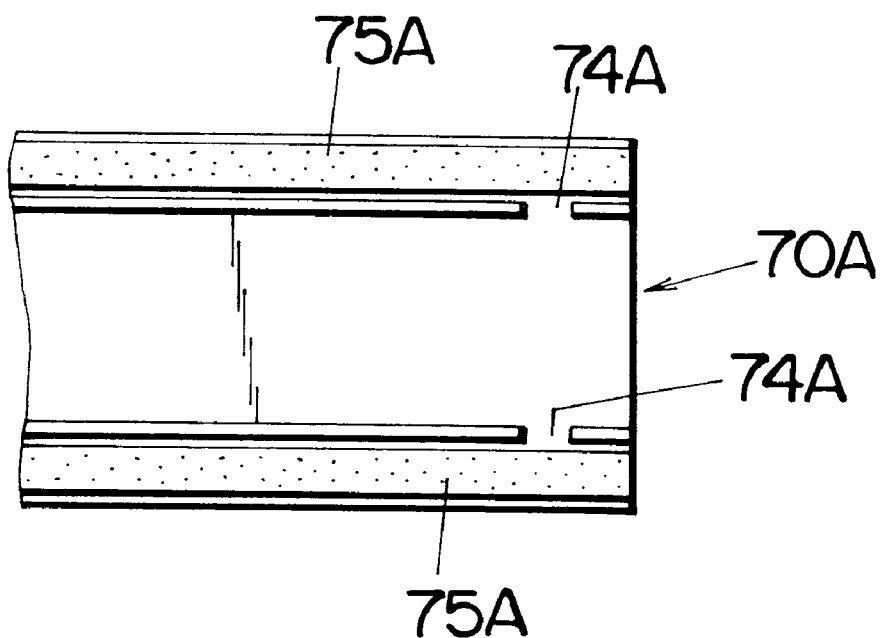

A water-seal fitting or top cover 70A is employed to positively connect the horizontal frames 30 of the vertically adjoining modules 10 and 80 to the horizontal rail 60A as well as to extends the full width of the modules for sealing the gap therebetween. The top cover 70A has a pair of legs 76 abutting against the inward ends of the ledges 63 and is secured to an anchor plate 77 by a bolt 78. The anchor plate 77 is disposed inside of the rail 60A with its opposite ends engaged behind the ledges 63 so that fastening the bolt 78 will press the ends of the top cover 70A against the horizontal frames 30 to secure the modules to the horizontal rail 60A, in the like manner as the top cover 50 for the vertical rail 40. As shown in FIGS. 9A and 9B, it is also contemplated to provide notches 74A in the legs 76 at the lengthwise ends of the top cover 70A to drain the rainwater for collection into the trough sections 47 of the associated vertical rails 40. Like sealing member 75A is formed on opposite ends of the cover 70A for water-seal contact with the associated horizontal frames 30. Installation of the array of the modules are made to connect the modules in the upper two horizontal rows last to the horizontal rail 60A before which the modules in the other horizontal rows are connected to the horizontal rails 60, simply by the engagement of the hooks 62 to the horizontal frames 30. Accordingly, when demounting the arrays of the modules, the top cover of the horizontal rail 60A is first removed to disconnect the associated module 10, as shown in FIG. 8B, and subsequently disengaging the other modules in the lower horizontal rows. It is noted in this connection, each of the vertical rails 40 is fitted with two or more separate top covers 50 in order to facilitate the mounting and demounting of the modules. It is noted at this time that horizontal rail as well as the vertical rail may be provided on its bottom with a suitable sealing member such as a rubber sheet.

FIG. 10 illustrates a modified horizontal rail 60B provided additionally with a brim 66 projecting from the end of the hook 62B. With the provision of the brim 66, the horizontal frame 30 would ride over the brim 66 to make the whole module inclined to a greater extent than otherwise, when it is not correctly engaged with the hook 62B of the horizontal rail 60, as shown in FIG. 11. Accordingly, it is readily confirmed of misconnection of the module for enhanced workability on the roof.

Figure 12:
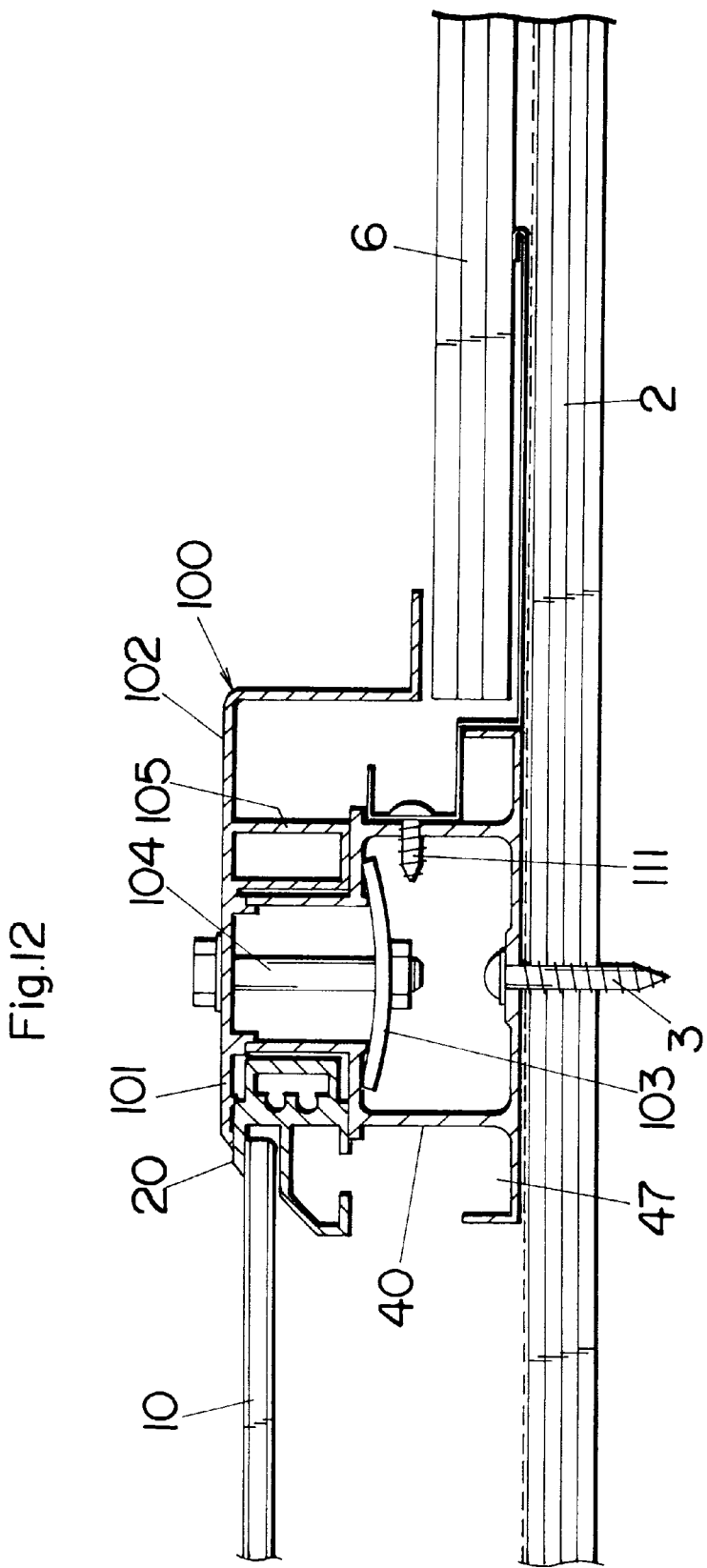
FIG. 12 is a sectional view of an end top cover secured to the vertical rail and extending over an adjacent shingles.

As shown in FIG. 12, the vertical rail 40 bordering on the outermost vertical column of the modules is fitted with at least one end top cover 100 which is fastened to an anchor plate 103 by a bolt 104. The end top cover 100 includes a flange 101 extending over the vertical frames 20 of the modules 10 sitting on one of the shoulder 44 of the vertical rail 40 and an extension flange 102 extending laterally beyond the other shoulder 44 and reaching shingles 6. The extension flange 102 includes a shoe 105 which is made analogous to the vertical frame 20 for sitting on the shoulder 44. The end of the extension flange 102 is a bent to overlap the end of the shingles 6. Secured to the vertical rail 40 by screws 111 is an underlayment 110 which extends between the horizontal rail 60 and the shingles 6 for collecting the rainwater proceeding through a gap between the end top cover 100 and the shingles 6 and for draining the same towards the eaves.

FIG. 13 shows an alternative end top cover 100A with a like extension flange 102A having a like shoe 105A and a pad 106 at the distal end of the extension flange. The pad 106 abuts against a complementary underlayment 110A so as to press it down as the top cover 100A is fastened to the vertical rail 40, thereby engaging a bent portion 112 of the underlayment intimately with the edges of the shingles 6. The end top cover 100A is secured to the fin 43 of the vertical rail 40 by screw 111A.

When the outer vertical columns of the modules 10 is adjacent closely to a gable of the roof, a gable apron 120 is secured to the outermost vertical rail 40 by screws 121 , as shown in FIG. 14. A corresponding gable top cover 130 is also secured to the vertical rail 40 by means of a bolt 134 and an anchor plate 133. The gable top cover 130 includes an extension flange 132 with a shoe 135 which presses a portion of the gable apron 120 against the shoulder 44 of the vertical rail 40. In the like manner as the top cover 50 and the end top cover 100, the gable top cover 130 includes a flange 131 which is pressed against the vertical frame 20 to hold the frame between the flange 131 and the shoulder 44 of the vertical rail 40.

Figure 15:
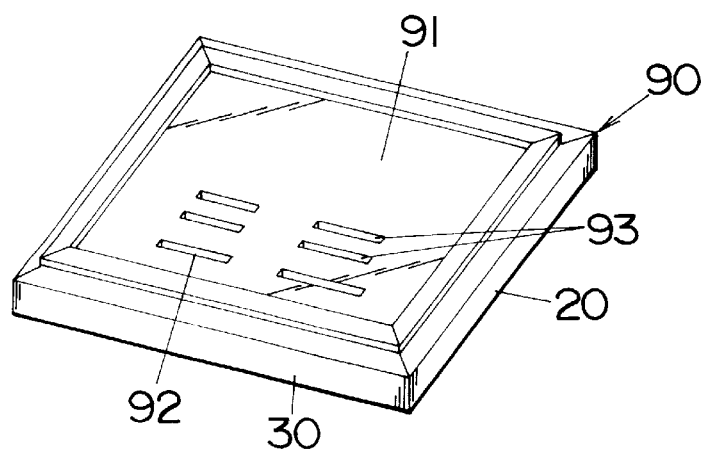
FIG. 15 is a perspective view of a ventilation module which may be included in the array of the solar battery modules.
Figure 16:
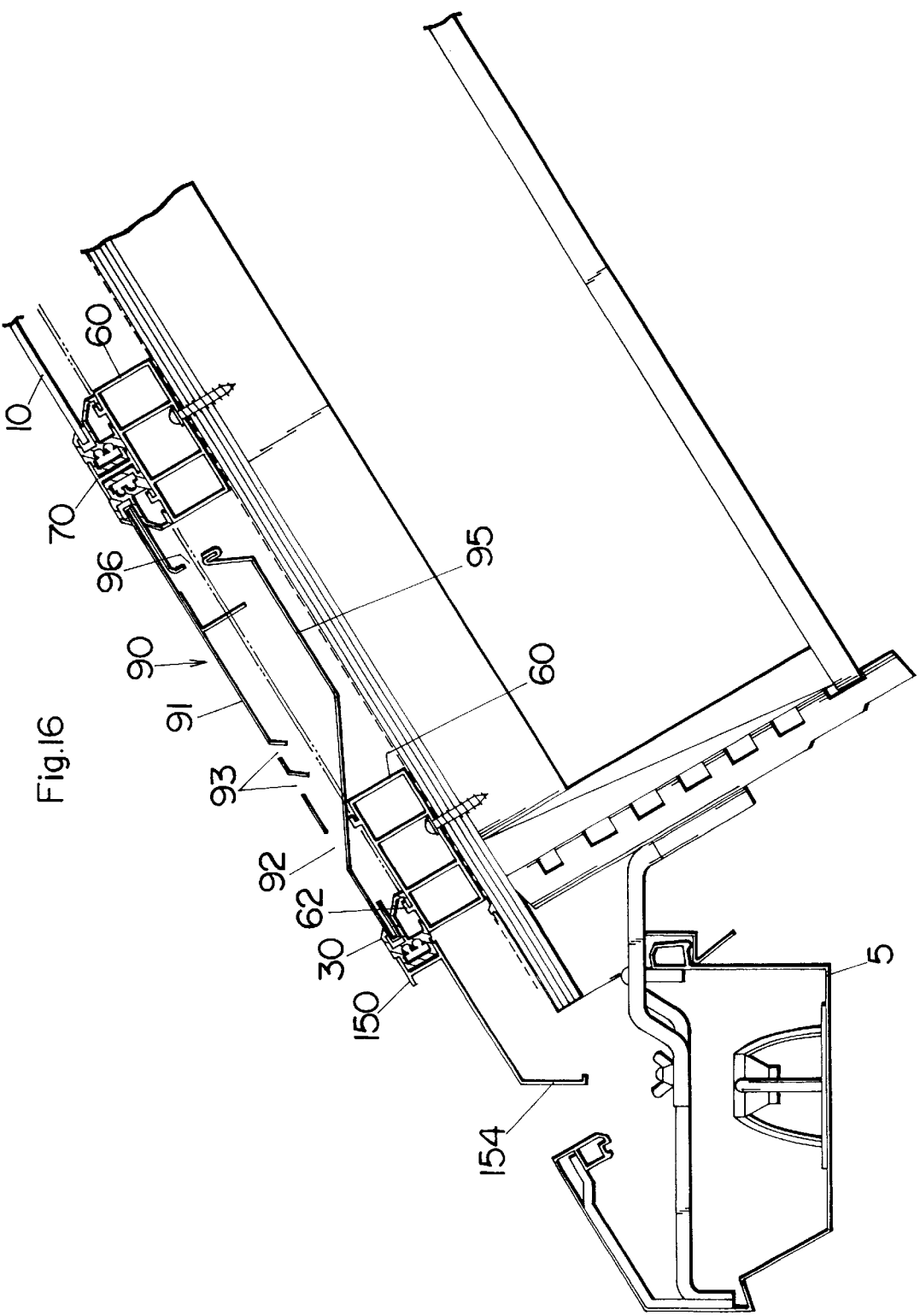
FIG. 16 is a sectional view of an eaves attachment connected to the horizontal rail.

Now, reference is made to the ventilation module 90 which, as shown in FIG. 15, is of a panel-like configuration of the identical planar dimensions as the solar battery module 10 and includes the frame of the identical structure to that of the solar battery module 10. The ventilation module 90 is included in the lower horizontal row of the array in order to introduce the outside air and allowing it to flow upwardly along the sloping direction through a space between the upper rows of the solar battery modules 10 and the sheathing 2 for cooling the solar battery modules 10 and therefore maintaining an optimum efficiency of generating the electric energy. As shown in FIG. 16, the ventilation module 90 includes an upper plate 91 and a lower plate 95 which are connected at the front and rear ends of the module 90. The periphery of the thus combined upper and lower plates 91 and 95 is held in the channels of the frame composed of vertical frames 20 and horizontal frames 30. The upper plate 91 is provided with drain holes 92 and air inlets 93 for introducing the outside air between the plates 91 and 95. The lower plate 95 is shaped to flow the introduced outside air through rear openings 96 as well as discharging the rainwater out through the drain holes 92. The outside air thus taken into the space between the ventilation module 90 and the sheathing 2 is allowed to flow upwardly along the sloping direction while passing around the lateral ends of the horizontal rails 60 to go through the space between the upper rows of the solar battery modules 10 and the sheathing 2, after which it is discharged outwardly at the ridge of the roof, for example, an exhaust opening 141 formed in a ridge cover 140, as shown in FIG. 20.

Figure 17:
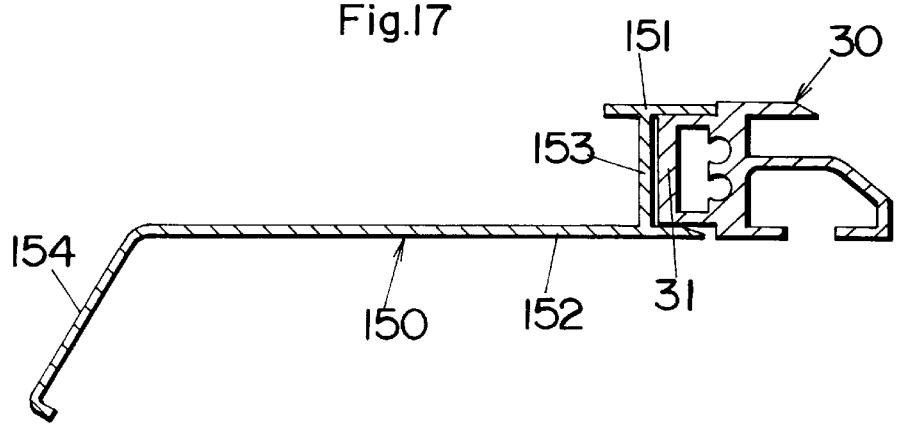
FIG. 17 is a sectional view of the eaves attachment and an associated portion of the frame of the solar battery module.
Figure 18:
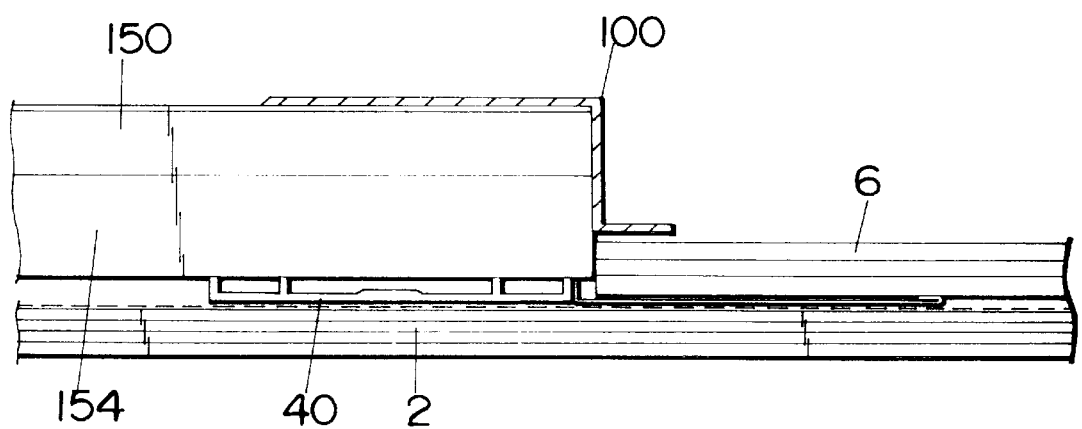
FIG. 18 is a front view of the eaves attachment shown with associated portion of the roof.

The lower horizontal frame 30 of the lower rows of the modules is engaged with the lower hook 62 on the lowermost horizontal rail 60 to project the hollow section 31 forwardly of the horizontal rail 60, as shown in FIG. 16. It is this projecting hollow section 31 that holds an eaves attachment 150 which extends along the full width of the horizontal row of the modules. As shown in FIG. 17, the eaves attachment 150 has a top flange 151 and a bottom flange 152 connected by a web 153. The top flange 151 and the bottom flange 152 is cooperative to form on one side of the web a catch recess for receiving therein the hollow section 31 of the horizontal frame 30. The bottom flange 152 on the other side of the web extends to define an apron 154 which covers the eaves of the roof and guide the rainwater into the gutter 5. The eaves attachment 150 thus engaged with the horizontal frame 30 is secured by screws to the vertical rails 40.

When the lower horizontal row of the array includes the solar battery module 10, the eaves attachment can be secured in the like manner to the horizontal frame 30 of the solar battery module 10, as shown in FIG. 19. It is noted in this connection that all the ventilation module 90 may be replaced with the solar battery modules 10.

The dummy module 80 is provided to adjust the vertical length of the array to the sloping length of the roof in order to extend a path of flowing the intake air from the eaves to the ridge of the roof beneath the array, as shown in FIG. 20. For this purpose, the dummy module 80 is made of a material capable of easily cut off, for example, cement, wood or glass plate. In this instance, the dummy module 80 includes a cement plate 81 on a wood frame 82. As shown in FIG. 21, the lateral ends of the dummy module 80 are secured to the vertical rails 40 in a like fashion as the solar battery module 10 with the use of the top cover 50 and the anchor plate 53. As shown in the figure, no horizontal rail is necessary for the upper end of the dummy module 80. Further, the dummy modules may be replaced with the solar battery modules 10 when the overall length of the array of the solar battery modules 10 matches with the sloping length of the roof. In any case, the ridge cover 140 overlaps the portions of the modules in the uppermost horizontal row.

Figure 24:
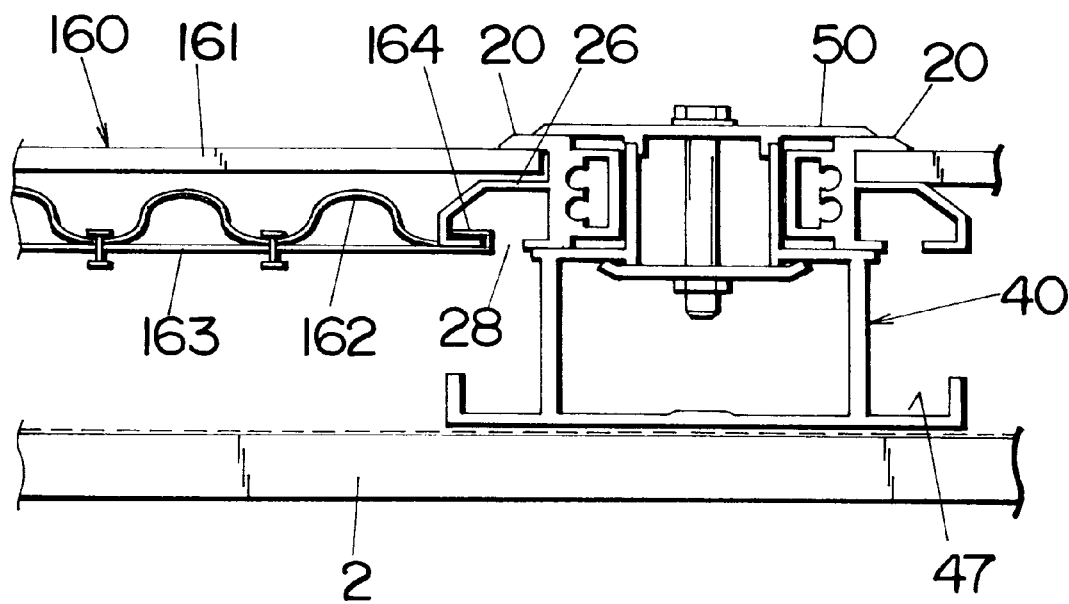
FIG. 24 is a sectional view of the solar collector module.

FIGS. 22 and 23 illustrate another array including the solar battery module 10 and solar collector modules 160 installed on the roof 1 with the use of the vertical rails 40, the horizontal rails 60, and associated parts as explained hereinbefore. The array is composed of lower horizontal rows of the solar battery modules 10 and upper horizontal rows of the solar collector modules 160 and the dummy modules 80. The solar collector module 160 is included to accumulate solar energy and heat the air flowing along the sloping direction towards the ridge of the roof, and is configured to have the identical planar dimensions as the solar battery module 10. As shown in FIG. 24, the solar collector module 160 comprises a glass plate 161 and a corrugated metal sheet 162 confined within the frame of the same structure as that of the solar battery module. The corrugated metal sheet 162 is preferably made of aluminum and is backed with a plurality of parallel aluminum-made supporting strips 163 each provided at its opposite ends with hooks 164 for engagement with slits 28 of the vertical frames 20. The glass plate 161 has its periphery inserted into recesses 26 of the same vertical frames 20. Thus, the parts of the solar collector module can be held together by the vertical frames 20. The air heated by the solar collector modules 160 is collected through an opening 8 formed below a ridge cover 140A for use in the room of the house such as for heating water. The ridge cover 140A includes no air outlet for escaping the heated air outwardly of the house and is therefore of a different structure from the ridge cover 140 as illustrated in FIG. 20.

Figure 25:
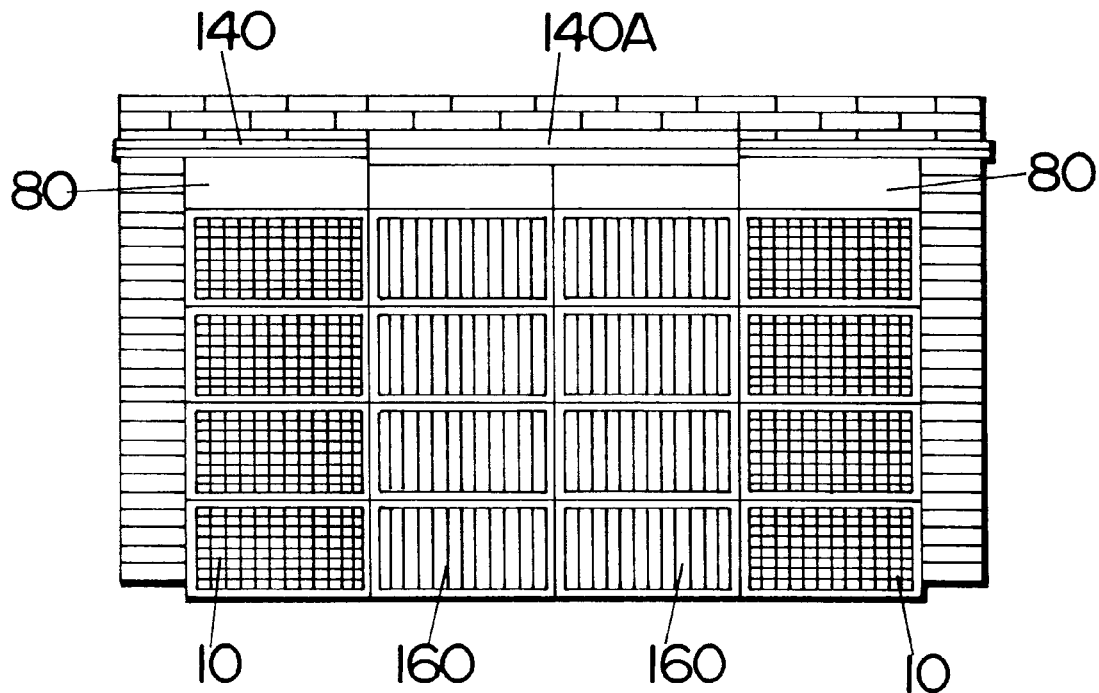
FIG. 25 is a further array of the solar battery modules and the solar collector modules installed on a roof.
Figure 26:
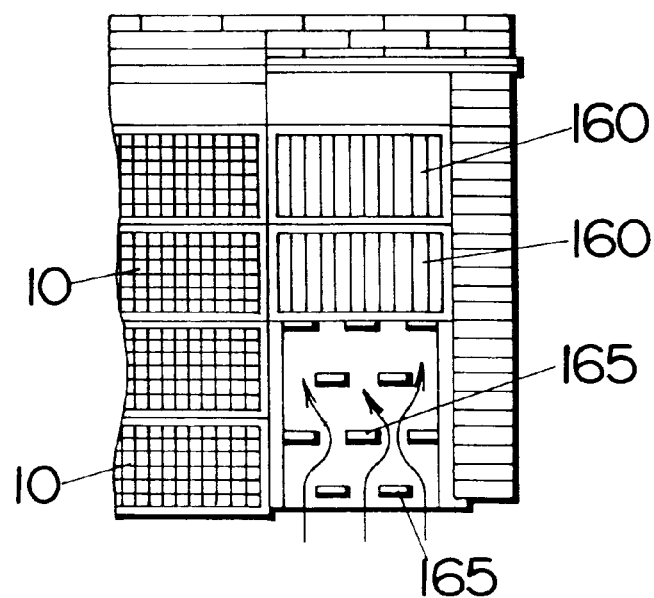
FIG. 26 is a portion of the array of FIG. 25 illustrating an air flow beneath the solar collector module.

FIG. 25 illustrates a further combination array of the solar battery modules 10, solar collector modules 160, and the dummy modules 80. The array includes inner columns of the solar battery modules 10, the outer columns of the solar collector modules 160, and a top row of the dummy modules 80 of which length is adjusted to the sloping length of the roof. As shown in FIG. 26, each of the solar collector modules 160 is provided on its bottom with baffles 165 which are arranged in rows with the baffles 165 of a row staggered with respect to those in adjacent rows in order to reduce the flow speed of the air moving from the eaves towards the ridge of the roof. The baffles 165 is preferably formed as integral parts of the solar collector module, but may be formed separately on the roof. The air introduced from the eaves is successively heated while passing below the columns of the solar collector modules 160 and is collected through the opening below the ridge cover 140A. The ridge cover 140 with the air outlet is mounted in association with the inner two columns of the solar battery modules 10.

Figure 28:
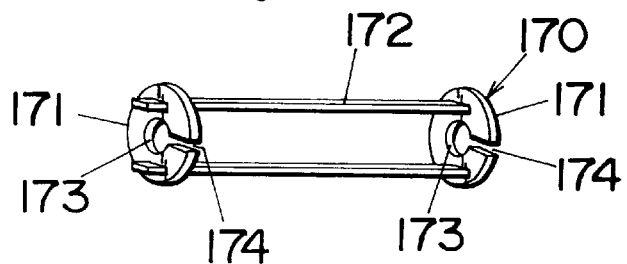
FIG. 28 is a perspective view of the coupling member.
Figure 27:
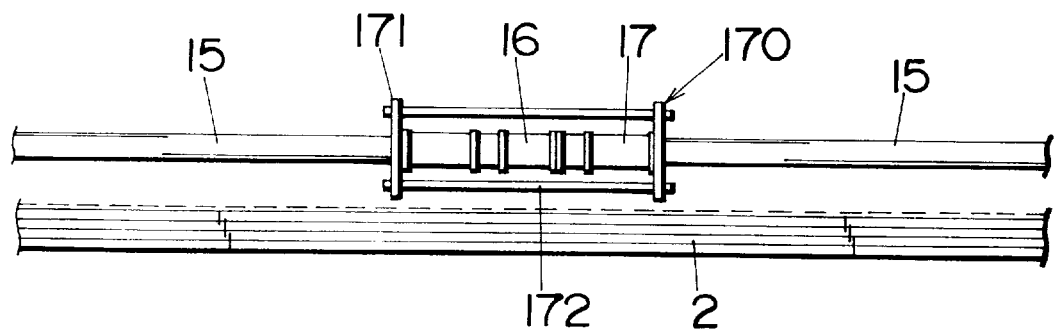
FIG. 27 is a view illustrating a coupling member disposed on the roof sheathing for electrical connection of the solar battery modules.

FIGS. 27 and 28 illustrate a joint protector 170 for protecting a joint of making electrical connection of cables 15 extending from the individual solar battery modules 10. The joint is composed of a plug 16 at the end of one cable 15 and a socket 17 at the end of the other cable 15. The joint protector 170 comprises a pair of metal disks 171 connected by rods 172 and spaced by a distance equal to a length of the joint. Each disk 171 has a center hole 173 of a diameter approximately equal to the diameter of the cable 15 and smaller than the diameters of the rear ends of the plug 16 and the socket 17. Also formed in each disk 171 is a slit 174 of such a width as to allow the cable 15 to be forcibly inserted into the hole 173 while resiliently deforming the disk but to retain the cable thereafter. With the use of the joint protector 170, the joint can be kept out of contact with the roof underlayment and can be therefore protected from receiving from the heat which would otherwise melt plastic insulation of the joint and result in electrical interruption of the solar modules. The use of the joint protector is particularly advantageous when the cables are routed adjacent the solar collector modules which inherently heat the nearby underlayment to a considerable extent. Further, the disks 171 can serve to retain the joint in its connected position, ensuring perpetual electrical connection.

| LIST OF REFERENCE NUMERALS | |
|---|---|
| 1 | roof |
| 2 | roof sheathing |
| 3 | screw |
| 4 | screw |
| 5 | gutter |
| 6 | shingle |
| 8 | opening |
| 10 | solar battery module |
| 12 | substrate |
| 15 | cable |
| 16 | plug |
| 17 | socket |
| 20 | vertical channel member (veritcal frame) |
| 21 | hollow section |
| 22 | fringe section |
| 23 | drain section |
| 24 | upper fringe |
| 25 | lower fringe |
| 26 | recess |
| 27 | inclined edge |
| 28 | slit |
| 29 | screw hole |
| 30 | horizontal channel member (horizontal frame) |
| 31 | hollow section |
| 32 | fringe section |
| 33 | drain section |
| 34 | upper fringe |
| 35 | lower fringe |
| 36 | recess |
| 37 | inclined edge |
| 38 | slit |
| 39 | screw hole |
| 40 | vertical rail |
| 41 | base |
| 43 | fin |
| 44 | shoulder |
| 45 | top opening |
| 47 | trough section |
| 50 | top cover |
| 51 | stud |
| 53 | anchor plate |
| 54 | bolt |
| 60 | horizontal rail |
| 61 | base |
| 62 | hook |
| 63 | ledge |
| 66 | brim |
| 70 | water-seal fitting |
| 71 | upper flange |
| 72 | lower flange |
| 73 | web |
| 74 | notch |
| 75 | sealing member |
| 76 | leg |
| 77 | anchor plate |
| 78 | bolt |
| 80 | dummy module |
| 81 | cement plate |

-continued

LIST OF REFERENCE NUMERALS

| | |
|---|---|
| 82 | wood frame |
| 90 | ventilation module |
| 91 | upper plate |
| 92 | drain hole |
| 93 | air inlet |
| 95 | lower plate |
| 96 | rear opening |
| 100 | end top cover |
| 101 | flange |
| 102 | extension flange |
| 103 | anchor plate |
| 104 | bolt |
| 105 | shoe |
| 106 | pad |
| 110 | underlayment |
| 111 | screw |
| 112 | bent portion |
| 120 | gable apron |
| 121 | screw |
| 130 | gable top cover |
| 131 | flange |
| 132 | extension flange |
| 133 | anchor plate |
| 134 | bolt |
| 135 | shoe |
| 140 | ridge cover |
| 141 | opening |
| 150 | eaves attachment |
| 151 | top flange |
| 152 | bottom flange |
| 153 | web |
| 154 | apron |
| 160 | solar collector module |
| 161 | glass plate |
| 162 | corrugated metal sheet |
| 163 | strip |
| 164 | hook |
| 165 | baffle |
| 170 | joint protector |
| 171 | disk |
| 172 | rod |
| 173 | hole |
| 174 | slit |

What is claimed:

1. A mounting system claimed in combination with suitable to install an array of solar battery modules, each of the solar battery modules providing a plurality of solar cells arranged within a rectangular frame to form a panel-like configuration on a roof, the roof having roof sheathing extending from a ridge of the roof, said system including:

a plurality of vertical rails secured to the roof and slopingly extend along the roof from the ridge of the roof toward the eaves, a laterally adjacent pair of said vertical rails hold the solar battery modules in a spaced relation from the roof sheathing;

each of said vertical rails having a rectangular base secured to the roof sheathing, a pair of stepped shoulders which extend away from the rectangular base toward the solar battery modules along an entire length of said vertical rail to support thereon the rectangular frames of adjoining solar battery modules;

a pair of trough sections which extend away from the rectangular base toward the solar battery modules along the entire length of said vertical rail, the trough sections being disposed outwardly of the stepped shoulders relative to a longitudinal axis of the vertical rails to receive rainwater that passes through joints formed by the rectangular frames within the vertical rails; and a plurality of horizontal rails extending in a direction perpendicular to a sloping direction of the roof, each horizontal rail engaging an intermediate portion of the rectangular frame between lateral ends of each vertically adjoining solar battery module, said horizontal rails secured at a bottom to the roof and having hooks that engage the frames of the adjoining solar battery modules located on opposite sides of each horizontal rail.

2. The mounting system as set forth in claim 1, wherein each of said vertical rails has a top opening defined between a pair of opposed fins upstanding from inward edges of said stepped shoulders, said system further comprising:

a top cover fitted over said top opening of said vertical rails and the frames of adjoining solar battery modules;

an anchor plate disposed inside each of said vertical rails, opposite lateral ends of said anchor plate respectively abut behind said stepped shoulders; and a bolt connecting said top cover of said vertical rail and said anchor plate through said top opening so that the top cover presses the frame of each solar battery module against corresponding stepped shoulders and said bolt pulls the anchor plate toward the top cover, thereby securing the solar battery module to said vertical rail.

3. The mounting system as set forth in claim 2, further including an end top cover that covers said vertical rail bordering an outer column of the solar battery modules in said array, said end top cover including a flange on one lateral side that extends over the frame of the solar battery module sitting on said stepped shoulder of said vertical rail and an extension flange on the other lateral side that extends beyond a corresponding stepped shoulder of said vertical rail to at least one shingle disposed laterally adjacent to the column of the solar battery modules, said extension flange having a shoe that engages the corresponding stepped shoulder.

4. The mounting system as set forth in claim 1, wherein at least one of said horizontal rails has a second top opening defined between a pair of opposed ledges, each ledge provided with said hook, said system further including a second top cover which extends a full width between a pair of adjacent vertical rails and is fitted over the frames of the adjoining solar modules, said second top cover having a pair of opposed legs extending to said ledges at a periphery of said second top opening and being connected to said at least one horizontal rail by a second anchor plate and a bolt, said second anchor plate being disposed inside of said at least one horizontal rail with opposite ends of said second anchor plate abutting respectively behind said ledges, and said bolt extending through said second opening to connect said second top cover to said second anchor plate so that the second top cover presses the frame of said solar battery modules against the corresponding ledge as the second anchor plate is pulled towards the second top cover by said bolt, thereby securing the solar battery module to said horizontal rail.

5. The mounting system as set forth in claim 1, further including an eaves attachment extending along the eaves of the roof, said eaves attachment having a unitary structure including a top flange and a bottom flange connected by a web, said top flange and bottom flange located on one side of said web being cooperative to form therebetween a catch recess that receives therein said frame of the solar battery module sitting on the horizontal rail, said bottom flange located on the other side of said web extending to define an apron which covers the eaves of the roof.

6. The mounting system as set forth in claim 1, further including a ventilation module having planar dimensions and a rectangular frame similar to the solar battery module, said ventilation module being disposed on a side of the eaves between an adjacent pair of said vertical rails to feed outside air into an internal space between the roof sheathing and the solar battery modules located nearer to the ridge of the roof than said ventilation module, said ventilation module comprising an upper plate with a plurality of inlets to introduce the outside air and a lower plate shaped to flow thus introducing outside air towards said internal space.

7. The mounting system as set forth in claim 1, further including dummy modules having a horizontal width the same as said solar battery module, said dummy module being made of material to adjust a length along a sloping direction of the roof and connected between said vertical rails at a location immediately adjacent to the ridge of the roof.

8. The mounting system a set forth in claim 1, wherein said rectangular frame includes a pair of opposed vertical channel members integrally connected to said vertical rails, vertical channel members having an identical cross section, a fringe section and a drain section formed immediately below said fringe section, said fringe section formed with an inwardly open recess to receive therein a periphery of a substrate carrying the solar cells, said fringe section comprising an upper fringe and a lower fringe defining therebetween said recess, said lower fringe defining an upper part of said drain section and being bent downwardly at an inward end of said lower fringe to form an inclined edge there at, said drain section being formed with a slit in a bottom of said drain section to drip rainwater proceeding along said lower fringe and said inclined edge off said drain section towards said trough section of said vertical rail, each of a horizontal channel member and said vertical channel members further including at least one screw hole extending along a length of said frame to receive a screw securing the vertical and horizontal channel members to make a miter joint therebetween.

9. The mounting system as set forth in claim 1, further including at least one solar collector module to accumulate solar energy and heat air flowing through a space between the at least one solar collector module and the roof sheathing, the at least one solar collector module having a planar configuration same as said solar battery module so as to be held between the pair of said vertical rails in a spaced relation from said roof sheathing, and baffle means provided on a bottom of said at least one solar collector module to reduce a speed of said air flow through said space from the eaves towards the ridge of the roof.

10. The mounting system as set forth in claim 9, wherein said at least one solar collector module comprises a glass plate, a corrugated metal sheet disposed below said glass plate, supporting strips secured to said metal sheet, and a frame having a configuration that is the same as said solar battery module, said supporting strips extending along said at least one solar collector module and are secured at distal ends to said frame together with corresponding ends of said glass plate.

* * * * *